United States Patent
Cremer et al.

(10) Patent No.: US 8,516,336 B2
(45) Date of Patent: Aug. 20, 2013

(54) LATCH ARRANGEMENT FOR AN ELECTRONIC DIGITAL SYSTEM, METHOD, DATA PROCESSING PROGRAM, AND COMPUTER PROGRAM PRODUCT FOR IMPLEMENTING A LATCH ARRANGEMENT

(75) Inventors: Michael Cremer, Leonberg (DE); Guenter Gerwig, Simmozheim (DE); Frank Lehnert, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/116,365

(22) Filed: May 26, 2011

(65) Prior Publication Data

US 2011/0320903 A1 Dec. 29, 2011

(51) Int. Cl.
 *H03M 13/00* (2006.01)
(52) U.S. Cl.
 USPC .......................................... 714/758; 714/733

(58) Field of Classification Search
 USPC .................. 327/197; 710/71; 714/752, 766, 714/764, 758, 733
 See application file for complete search history.

(56) References Cited

U.S. PATENT DOCUMENTS

| 4,580,066 | A | * | 4/1986 | Berndt | 327/197 |
| 4,612,640 | A | * | 9/1986 | Mehrotra et al. | 714/766 |
| 4,730,320 | A | * | 3/1988 | Hidaka et al. | 714/766 |
| 5,633,882 | A | | 5/1997 | Babb et al. | |
| 5,799,211 | A | * | 8/1998 | Hakkarainen et al. | 710/71 |
| 6,590,929 | B1 | | 7/2003 | Williams | |
| 7,844,871 | B2 | * | 11/2010 | Brandt et al. | 714/733 |

* cited by examiner

*Primary Examiner* — David Ton
(74) *Attorney, Agent, or Firm* — Robert R. Williams

(57) ABSTRACT

An improved latch arrangement for an electronic digital system is disclosed. The latch arrangement comprises a certain number of standard latches configured as configuration-switch latches which are modified only by shift operation and/or during Error Checking and Correction (ECC) action, and a corresponding number of standard latches configured as Error Checking and Correction (ECC) latches storing Error Checking and Correction (ECC) bit data used to check latch data of said configuration-switch latches.

15 Claims, 3 Drawing Sheets

LATCH ARRANGEMENT FOR AN ELECTRONIC DIGITAL SYSTEM, METHOD, DATA PROCESSING PROGRAM, AND COMPUTER PROGRAM PRODUCT FOR IMPLEMENTING A LATCH ARRANGEMENT

BACKGROUND OF THE INVENTION

1. Field of the Invention

The present invention relates in general to the field of modern electronic digital systems with increasing complexity, and in particular to a latch arrangement for such an electronic digital system, and a corresponding method for implementing a latch arrangement. Still more particularly, the present invention relates to a data processing program and a computer program product for implementing a latch arrangement.

2. Description of the Related Art

In modern electronic digital systems, like Central Processing Units (CPUs), with increasing complexity sophisticated functions are implemented to gain still more performance improvements. Some of these functions need to be flexible and not be finally fixed in hardware. So the hardware behavior can be modified with switches and it is not always required to design and/or manufacture a new chip layout when a modification of the hardware behavior is required.

For the modification of the hardware behavior process configuration-switch latches are used. The configuration-switch latches are latches that can be modified by shift operation, but do not change their value once the processor is in normal operation. Typically such configuration-switch latches were used during bring-up and testing of the electronic digital system, but mostly not for normal operation at customer side. Now with the increasing complexity of the electronic digital systems the number of such configuration-switch latches is increasing too and the configuration-switch latches are used for final hardware also. With that also Reliability, Availability and Serviceability (RAS) requirements for the configuration-switch latches need to be considered, which was not necessary when the configuration-switch latches were used during bring-up and/or testing of the electronic digital systems only.

For implementing of the Reliability, Availability and Serviceability (RAS) coverage with configuration-switch latches two strategies are known. A first strategy uses special latches which are hardened against hardware fail. This improves the Reliability, Availability and Serviceability (RAS) coverage at the cost of chip area since these latches are much larger than normal latches and the chance for an undetected error is only reduced. A second strategy uses extra configuration-switch parity latches for protection of groups of these configuration-switch latches. This delivers better Reliability, Availability and Serviceability (RAS) coverage, but has the disadvantage of making the different configuration-switch latches dependent to each other. During simulation and bring-up this often causes problems, since the parity needs to be set according to the value of all configuration-switch latches in one group and so one configuration-switch latch cannot be set independent of the other configuration-switch latches.

In U.S. Pat. No. 5,633,882 "ERROR DETECTION AND CORRECTION CIRCUIT" by Babb et al. an error detection and correction circuit is disclosed. The disclosed error detecting and correcting circuit comprises a check bit output latch which stores check bits generated by a check bit generator and outputs the newly generated check bits to memory when a single error occurs in the word located in the check bits. The data is corrected so the newly generated check bits are correct and can be latched out to memory at the same time the data is latched out. Additionally the error detecting and correcting circuit includes a syndrome generator, an error corrector, and an error detector. The described error detecting and correcting circuit provides error detection and correction circuits correcting check bits in memory with newly generated check bits when no errors in the data word are detected.

In U.S. Pat. No. 6,590,929 B1 "METHOD AND SYSTEM FOR RUN-TIME LOGIC VERIFICATION OF OPERATIONS IN DIGITAL SYSTEMS" by Williams a method and system for run-time logic verification of operations in digital systems are disclosed. The disclosed system for controllable run-time verification of operations in a logic structure of a digital system comprises a controllable bit stream generator having means for producing a controlled bit stream output, which corresponds to a bit sequence instantiating a verification of operations within the logic structure; means for coupling the controlled bit stream output to the logic structure, wherein the logic structure includes a data array coupled via a plurality of logic gates to an error correcting code encoder which detects and corrects a single bit error in the data; and means for verifying the operations of the logic structure utilizing the controlled bit stream output. The verifying means include means for instantiating a generation of the controlled bit stream output wherein a sequence of bits represents the data; and means for sending the controlled bit stream output to the plurality of logic gates.

SUMMARY OF THE INVENTION

The technical problem underlying the present invention is to provide a latch arrangement for a electronic digital system and a method for implementing a latch arrangement, which are able to implement Reliability, Availability and Serviceability (RAS) coverage for latch arrangements of configuration-switch latches and solve the above mentioned shortcomings and pain points of prior art latch arrangements of configuration-switch latches, and to provide a data processing program and a computer program product to perform the method for implementing a latch arrangement.

According to the present invention this problem is solved by providing a latch arrangement for a electronic digital system having the features of claim 1, a method for implementing a latch arrangement having the features of claim 11, a data processing program for performing the method for implementing a latch arrangement having the features of claim 14, and a computer program product causing a computer to perform the method for implementing a latch arrangement having the features of claim 15. Advantageous embodiments of the present invention are mentioned in the sub claims.

Accordingly, in an embodiment of the present invention a latch arrangement for a electronic digital system comprises a certain number of standard latches configured as configuration-switch latches, which are modified only by shift operation and/or during Error Checking and Correction (ECC) action, and a corresponding number of standard latches configured as Error Checking and Correction (ECC) latches storing Error Checking and Correction (ECC) bit data used to check latch data of the configuration-switch latches.

In further embodiments of the present invention, an Error Checking and Correction (ECC) generating means is generating Error Checking and Correction (ECC) data based on the latch data.

In further embodiments of the present invention, comparing means are comparing the generated Error Checking and Correction (ECC) data with the stored Error Checking and Correction (ECC) bit data to obtain an error status.

In further embodiments of the present invention, syndrome latches are storing comparison results of the comparing means.

In further embodiments of the present invention, correction data generating means are generating correction data based on the comparison result to modify the latch data stored in the configuration-switch latches and/or the Error Checking and Correction (ECC) bit data stored in the Error Checking and Correction (ECC) latches.

In further embodiments of the present invention, a first multiplexing means is used to modify the latch data stored in the configuration-switch latches and a second multiplexing means is used to modify the Error Checking and Correction (ECC) bit data stored in the Error Checking and Correction (ECC) latches.

In further embodiments of the present invention, error detection control means are generating control signals to control the multiplexing means and/or error detection signals to report the error status based on the comparison result and/or system status.

In another embodiment of the present invention, a method for implementing a latch arrangement for a electronic digital system, wherein the latch arrangement comprises a certain number of configuration-switch latches, which are modified only by shift operation and/or during Error Checking and Correction (ECC) action, is configuring a certain number of standard latches as configuration-switch latches and a corresponding number of standard latches as Error Checking and Correction (ECC) latches, is storing latch data in the configuration-switch latches by performing a shift operation, and is storing Error Checking and Correction (ECC) bit data in the Error Checking and Correction (ECC) latches, wherein the Error Checking and Correction (ECC) bit data are used to check the latch data of the configuration-switch latches.

In further embodiments of the present invention, every cycle Error Checking and Correction (ECC) data are generated based on the latch data and compared with the stored Error Checking and Correction (ECC) bit data to obtain an error status.

In further embodiments of the present invention, a first control signal is generated to automatically initialize said Error Checking and Correction (ECC) latches with the Error Checking and Correction (ECC) data generated by the Error Checking and Correction (ECC) generating means based on the latch data following a performed shift operation of the configuration-switch latches.

In further embodiments of the present invention, a second control signal and/or a first error detection signal are generated based on the comparison result, wherein the second control signal is used to modify the latch data stored in the configuration-switch latches with the latch data of a previous cycle and/or the Error Checking and Correction (ECC) bit data stored in the Error Checking and Correction (ECC) latches with the Error Checking and Correction (ECC) bit data of the previous cycle, if a first error status representing "no error" is detected, wherein the first error detection signal is used to report the first error status.

In further embodiments of the present invention, a third control signal and/or a second error detection signal are generated based on the comparison result, wherein the third control signal is used to modify the latch data stored in the configuration-switch latches and/or the Error Checking and Correction (ECC) bit data stored in the Error Checking and Correction (ECC) latches with correction data generated by the correction data generating means based on the comparison result, if a second error status representing a "correctable error" is detected, wherein the second error detection signal is used to report the second error status.

In further embodiments of the present invention, a third error detection signal is generated based on the comparison result, if a third error status representing an "uncorrectable error" is detected, wherein the third error detection signal is used to report the third error status.

In another embodiment of the present invention, a data processing program for execution in a data processing system comprises software code portions for performing a method for implementing a latch arrangement when the program is run on said data processing system.

In yet another embodiment of the present invention, a computer program product stored on a computer-usable medium, comprises computer-readable program means for causing a computer to perform a method for implementing a latch arrangement when the program is run on the computer.

All in all, embodiments of the present invention address the problem of covering Reliability, Availability and Serviceability (RAS) for configuration-switch latches used in electronic digital systems.

The core idea of the present invention is to implement standard latches as configuration-switch latches, wherein additional Error Checking and Correction (ECC) latches are used to check latch data stored in the configuration-switch latches. The standard latches, e.g. master slave latches, may be assigned to groups and a certain number of Error Checking and Correction (ECC) latches are assigned to every group of configuration-switch latches and used to check the latch data of the corresponding configuration-switch latches. For avoiding initialization problems an automated mechanism may be used to initialize the Error Checking and Correction (ECC) latches with Error Checking and Correction (ECC) bit data. The correct Error Checking and Correction (ECC) data is supervised all time by comparing generated Error Checking and Correction (ECC) data with the Error Checking and Correction (ECC) bit data from the Error Checking and Correction (ECC) latches. The comparison result may be saved in corresponding syndrome latches. Additional the comparison result may be used to correct the latch data of the configuration-switch latches and/or the Error Checking and Correction (ECC) bit data automatically, when just one bit error has occurred. Additional the error status that a correctable error occurred is reported. If more than one bit error occurs no correction process is performed, but the error status is reported.

Embodiments of the present invention are able to offer a high level of Reliability, Availability and Serviceability (RAS) coverage for configuration-switch latches, since a single bit error is correctable and two or more bit errors can securely be detected and reported.

Additional benefits/advantages of embodiments of the present invention include low hardware requirements, since standard latches are used, which are much smaller than hardened configuration-switch latches. The size of the hardened configuration-switch latches is with the 32 nm technology about four times as big as the size of the standard latches. So the total chip area of embodiments of the present invention is significantly smaller even the number of the used latches is higher. Also embodiments of the invention can be implemented in fast running core clock domains. Advantageously embodiments of the present invention allow modifying the content of each configuration-switch latch independently from the other configuration-switch latches, since the Error Checking and Correction (ECC) data are newly generated after each shift operation.

Embodiments of the present invention may preferably be used for different numbers of switches; the relative effort is reduced on wider designs. With gating clocking signals, the explicit hold path can be avoided, which saves chip area and power since the correction is a very rare action and so there is no power required for clocking the latches all the time. Embodiments of the present invention can be used in extra slow clocking clock domain also, which would save additionally chip area and power.

The above, as well as additional purposes, features, and advantages of the present invention will become apparent in the following detailed written description.

BRIEF DESCRIPTION OF THE DRAWINGS

Preferred embodiments of the present invention, as described in detail below, are shown in the drawings, in which.

DETAILED DESCRIPTION OF THE PREFERRED EMBODIMENTS

Figure 1:
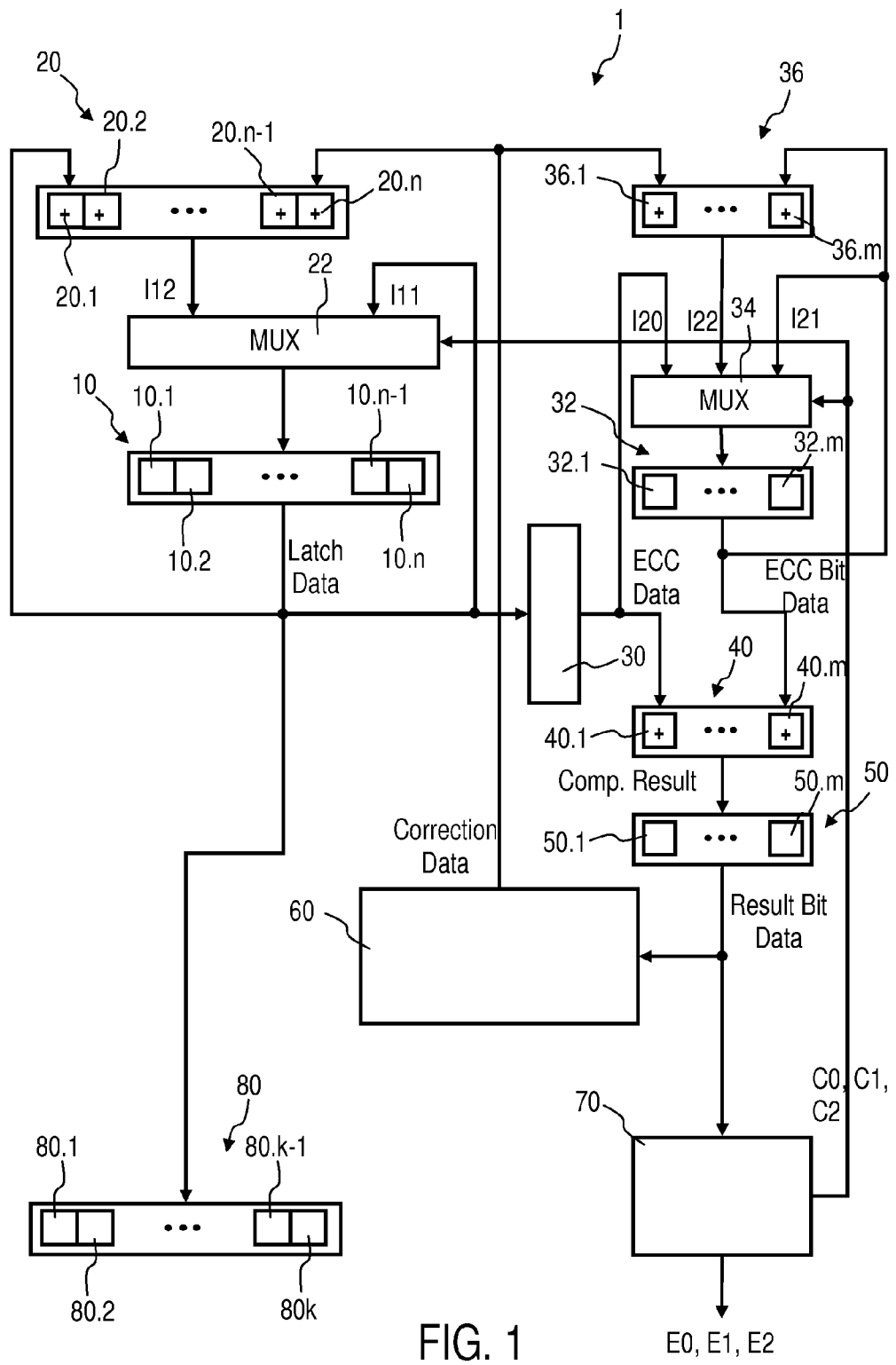
FIG. 1 is a schematic block diagram of a latch arrangement for an electronic digital system, in accordance with an embodiment of the present invention.

Referring to FIG. 1, the shown embodiment of the present invention employs a latch arrangement 1 for an electronic digital system 80. The latch arrangement 1 comprises a certain number of standard latches configured as configuration-switch latches 10.1 to 10.$n$, which are modified only by shift operation and/or during Error Checking and Correction (ECC) action, and a corresponding number of standard latches configured as Error Checking and Correction (ECC) latches 32.1 to 32.$m$ storing Error Checking and Correction (ECC) bit data used to check latch data of the configuration-switch latches 10.1 to 10.$n$, an Error Checking and Correction (ECC) generating means 30 generating Error Checking and Correction (ECC) data based on the latch data, comparing means 40 comparing generated Error Checking and Correction (ECC) data with the stored Error Checking and Correction (ECC) bit data to obtain an error status, a group 50 of syndrome latches 50.1 to 50.$m$ storing comparison results of the comparing means 40, and correction data generating means 60 generating correction data based on the comparison result to modify the latch data stored in the configuration-switch latches 10.1 to 10.$n$ and/or the Error Checking and Correction (ECC) bit data stored in the Error Checking and Correction (ECC) latches 32.1 to 32.$m$.

The comparing means 40 comprises a certain number of Exclusive-OR gates 40.1 to 40.$m$ each comparing a data bit of the Error Checking and Correction (ECC) data generated by the Error Checking and Correction (ECC) generating means 30 and a corresponding data bit of the Error Checking and Correction (ECC) bit data of a previous cycle stored in the Error Checking and Correction (ECC) latches 32.1 to 32.$m$. The comparison result of each Exclusive-OR gate 40.1 to 40.$m$ is written to a corresponding syndrome latch 50.1 to 50.$m$.

Additionally a first multiplexing means 22 is used to modify the latch data stored in the configuration-switch latches 10.1 to 10.$n$ and a second multiplexing means 34 is used to modify the Error Checking and Correction (ECC) bit data stored in the Error Checking and Correction (ECC) latches 32.1 to 32.$m$, wherein error detection control means 70 are generating control signals C0, C1, C2 to control the multiplexing means 22, 34 and/or error detection signals E0, E1, E2 to report the error status based on the comparison result and/or a system status.

The first multiplexing means 22 comprises inputs for first input data I11 and second input data I12. The first input data I11 of the first multiplexing means 22 are output data of further comparing means 20 comprising a certain number of Exclusive-OR gates 20.1 to 20.$n$ each comparing a data bit of the correction data generated by the correction data generating means 60 and a corresponding data bit of the latch data of the previous cycle stored in the configuration-switch latches 10.1 to 10.$n$. The second input data I12 of the first multiplexing means 22 are the latch data of the previous cycle stored in the configuration-switch latches 10.1 to 10.$n$.

The second multiplexing means 34 comprises inputs for first input data I21, second input data I22 and third input data I20. The first input data I21 of the second multiplexing means 34 are output data of yet further comparing means 36 comprising a certain number of Exclusive-OR gates 36.1 to 36.$m$ each comparing a data bit of the correction data generated by the correction data generating means 60 and a corresponding data bit of the Error Checking and Correction (ECC) bit data of the previous cycle stored in the Error Checking and Correction (ECC) latches 32.1 to 32.$m$. The second input data I22 of the second multiplexing means 34 are the Error Checking and Correction (ECC) bit data of the previous cycle stored in the Error Checking and Correction (ECC) latches 32.1 to 32.$m$. The third input data I20 of the second multiplexing means 34 are the Error Checking and Correction (ECC) data generated by the Error Checking and Correction (ECC) generating means 30.

Still referring to FIG. 1, the latch data of the configuration-switch latches 10.1 to 10.$n$ are used to initialize one or more different combination logic embodiments or functions 80.1 to 80.$k$ of the electronic digital system 80 since the configuration-switch latches 10.1 to 10.$n$ are latches storing latch data that can be modified by shift operation and/or Error Checking and Correction (ECC) action only but do not change their data values once the electronic digital system 80 is in normal operation. Typically the configuration-switch latches 10.1 to 10.$n$ are used during bring-up and testing of the electronic digital system 80.

The latch arrangement 1 may comprise between 2 and 128 preferably 32 standard latches, e.g. master slave latches, used as configuration-switch latches 10.1 to 10.$n$, and between 3 and 10 standard latches, e.g. master slave latches, used as Error Checking and Correction (ECC) latches 32.1 to 32.$m$, for example. The shown configuration-switch latches 10.1 to 10.$n$ are assigned to a corresponding group 10 and a corresponding group 32 of Error Checking and Correction (ECC) latches 32.1 to 32.$m$ is assigned to the group 10 of configuration-switch latches 10.1 to 10.$n$. In the case of 32 configuration-switch latches 10.1 to 10.$n$ seven additional standard latches are used as Error Checking and Correction (ECC) latches 32.1 to 32.$m$, wherein the comparing means 20 comprise 32 Exclusive-OR gates 32.1 to 32.$n$, and the comparing means 36 and 40 each comprise seven Exclusive-OR gates 36.1 to 36.$m$ and 40.1 to 40.$m$, in case of 32 configuration-switch latches 10.1 to 10.$n$, and wherein seven syndrome latches 50.1 to 50.$m$ are used in case of 32 configuration-switch latches 10.1 to 10.$n$.

Figure 2:
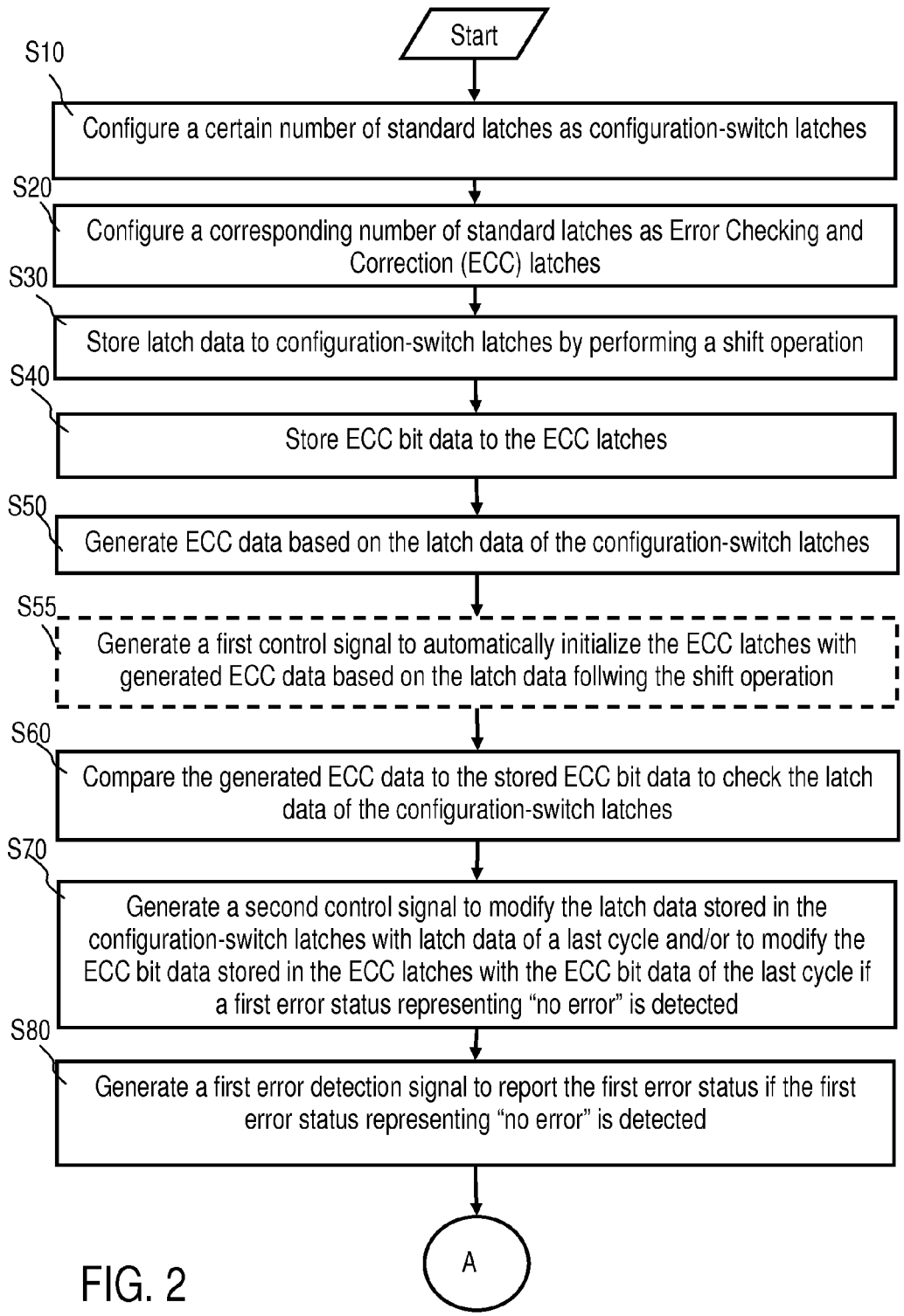
FIG. 2 is a schematic process flow of a first part of a method for implementing a latch arrangement, in accordance with an embodiment of the present invention.
Figure 3:
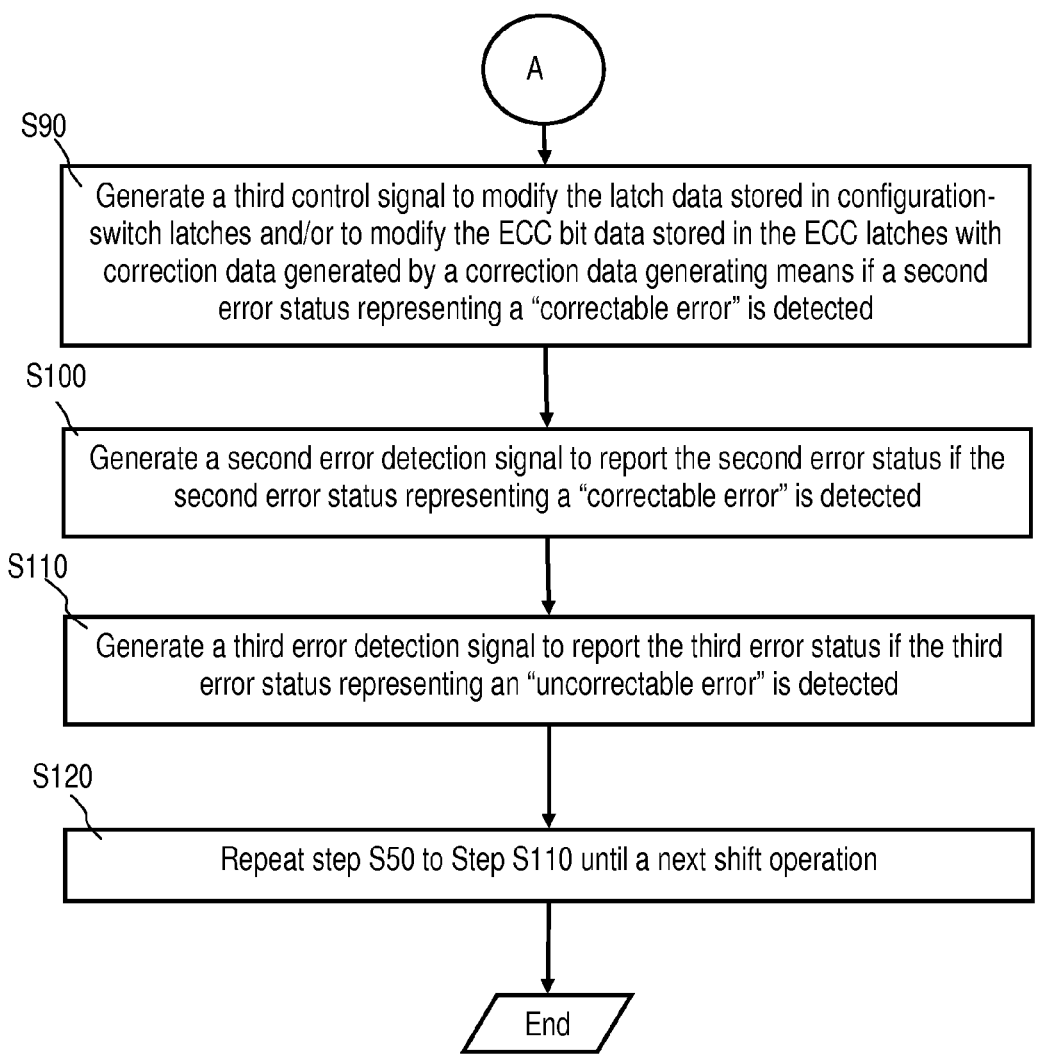
FIG. 3 is a schematic process flow of a second part of a method for implementing a latch arrangement, in accordance with an embodiment of the present invention.

FIGS. 2 and 3 show a schematic process flow of a method for implementing a latch arrangement, in accordance with an embodiment of the present invention.

Referring to FIGS. 2 and 3 a certain number of standard latches is configured as configuration-switch latches 10.1 to 10.n in a step S10 and a corresponding number of standard latches is configured as Error Checking and Correction (ECC) latches 32.1 to 32.m in a step S20. During step S30 latch data are stored to the configuration-switch latches 10.1 to 10.n by performing a shift operation, and Error Checking and Correction (ECC) bit data are stored to the Error Checking and Correction (ECC) latches 32.1 to 32.m during step S40. During step S50 Error Checking and Correction (ECC) data are generated based on the latch data and compared with the stored Error Checking and Correction (ECC) bit data to check the latch data stored in the configuration-switch latches 10.1 to 10.n and to obtain an error status during step S60.

Instead of step S40 a step S55 may be used to automatically initialize the Error Checking and Correction (ECC) latches 32.1 to 32.m with the Error Checking and Correction (ECC) data generated by the Error Checking and Correction (ECC) generating means 30. To implement this automatic initialization of the Error Checking and Correction (ECC) latches 32.1 to 32.m a first control signal C0 is generated and sent to the second multiplexer means 34 to activate the third input data 120 representing the generated Error Checking and Correction (ECC) data. The first control signal C0 is generated from the error detection control means 70 after a shift operation with the configuration-switch latches 10.1 to 10.n and the corresponding generation of the Error Checking and Correction (ECC) data by the Error Checking and Correction (ECC) generating means 30.

In step S70 a second control signal C1 is generated from the error detection control means 70 based on the comparison result, wherein the second control signal C1 is used to modify the latch data stored in the configuration-switch latches 10.1 to 10.n with the latch data of a previous cycle and/or the Error Checking and Correction (ECC) bit data stored in the Error Checking and Correction (ECC) latches 32.1 to 32.m with the Error Checking and Correction (ECC) bit data of the previous cycle, if a first error status representing "no error" is detected. Therefore the second control signal C1 is sent to the first multiplexing means 22 to activate the first input data I11 of the first multiplexing means 22 representing the latch data of a previous cycle and/or to the second multiplexer means 34 to activate the first input data I21 of the second multiplexing means 34 representing the Error Checking and Correction (ECC) bit data of the previous cycle.

In step S80 a first error detection signal E0 is generated based on the comparison result used to report the first error status "no error".

In step S90 a third control signal C2 is generated based on the comparison result, wherein the third control signal C2 is used to modify the latch data stored in the configuration-switch latches 10.1 to 10.n and/or the Error Checking and Correction (ECC) bit data stored in the Error Checking and Correction (ECC) latches 32.1 to 32.m with correction data generated by the correction data generating means 60 based on the comparison result, if a second error status representing a "correctable error" is detected. The second error status is detected, if just one bit of the latch data or the Error Checking and Correction (ECC) bit data has changed logical state due to uncontrollable extern influence. Therefore the third control signal C2 is sent to the first multiplexing means 22 to activate the second input data I12 of the first multiplexing means 22 representing the output data of the comparing means 20 and/or to the second multiplexer means 34 to activate the second input data I22 of the second multiplexing means 34 representing the output data of the comparing means 36 to correct the latch data stored in the configuration-switch latches 10.1 to 10.n and/or the Error Checking and Correction (ECC) bit data stored in the Error Checking and Correction (ECC) latches 32.1 to 32.m.

In step S100 a second error detection signal E1 is generated based on the comparison result used to report the second error status "correctable error".

In step S110 a third error detection signal E2 is generated based on the comparison result used to report the third error status "uncorrectable error". The third error status is detected, if two or more bits of the latch data or the Error Checking and Correction (ECC) bit data have changed logical state due to uncontrollable extern influence.

According to step S120 the steps S50 to S110 are repeated until the next shift operation of the configuration-switch latches 10.1 to 10.n.

The inventive method for implementing a latch arrangement can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A latch arrangement for an electronic digital system, comprising
a certain number of standard latches configured as configuration-switch latches which are modified only by shift operation and/or during Error Checking and Correction (ECC) action, and a corresponding number of standard latches configured as Error Checking and Correction (ECC) latches storing Error Checking and Correction (ECC) bit data used to check latch data of said configuration-switch latches.

2. The latch arrangement according to claim 1, wherein a Error Checking and Correction (ECC) generating means (30) is generating Error Checking and Correction (ECC) data based on said latch data.

3. The latch arrangement according to claim 2, wherein comparing means are comparing said generated Error Checking and Correction (ECC) data with said stored Error Checking and Correction (ECC) bit data to obtain an error status.

4. The latch arrangement according to claim 3, wherein syndrome latches are storing comparison results of said comparing means.

5. The latch arrangement according to claim 4, wherein correction data generating means are generating correction data based on said comparison result to modify said latch data stored in said configuration-switch latches and/or said Error Checking and Correction (ECC) bit data stored in said Error Checking and Correction (ECC) latches.

6. The latch arrangement according to claim 5, wherein a first multiplexing means is used to modify said latch data stored in said configuration-switch latches and a second multiplexing means is used to modify said Error Checking and Correction (ECC) bit data stored in said Error Checking and Correction (ECC) latches.

7. The latch arrangement according to claim 6, wherein error detection control means are generating control signals (C0, C1, C2) to control said multiplexing means and/or error detection signals (E0, E1, E2) to report said error status based on said comparison result and/or system status.

8. A method for implementing a latch arrangement for a electronic digital system, wherein said latch arrangement comprises a certain number of configuration-switch latches, which are modified only by shift operation and/or during Error Checking and Correction (ECC) action, said method comprises:
configuring a certain number of standard latches as configuration-switch latches and a corresponding number of standard latches as Error Checking and Correction (ECC) latches,
storing latch data in the configuration-switch latches by performing a shift operation, and
storing Error Checking and Correction (ECC) bit data in said Error Checking and Correction (ECC) latches,
wherein said Error Checking and Correction (ECC) bit data are used to check said latch data of said configuration-switch latches.

9. The method according to claim 8, wherein every cycle Error Checking and Correction (ECC) data are generated based on said latch data and compared with said stored Error Checking and Correction (ECC) bit data to obtain an error status.

10. The method according to claim 9, wherein a first control signal (C0) is generated to automatically initialize said Error Checking and Correction (ECC) latches with said Error Checking and Correction (ECC) data generated by said Error Checking and Correction (ECC) generating means based on said latch data following a performed shift operation with said configuration-switch latches.

11. The method according to claim 10, wherein a second control signal (C1) and/or a first error detection signal (E0) are generated based on said comparison result, wherein said second control signal (C1) is used to modify said latch data stored in said configuration-switch latches with said latch data of a previous cycle and/or said Error Checking and Correction (ECC) bit data stored in said Error Checking and Correction (ECC) latches with said Error Checking and Correction (ECC) bit data of said previous cycle, if a first error status representing "no error" is detected, wherein said first error detection signal (E0) is used to report said first error status.

12. The method according to one of the preceding claim 11, wherein a third control signal (C2) and/or a second error detection signal (E1) are generated based on said comparison result, wherein said third control signal (C2) is used to modify said latch data stored in said configuration-switch latches and/or said Error Checking and Correction (ECC) bit data stored in said Error Checking and Correction (ECC) latches with correction data generated by said correction data generating means based on said comparison result, if a second error status representing a "correctable error" is detected, wherein said second error detection signal (E1) is used to report said second error status.

13. The method according to one of the preceding claim 12, wherein a third error detection signal (E2) is generated based on said comparison result, if a third error status representing an "uncorrectable error" is detected, wherein said third error detection signal (E2) is used to report said third error status.

14. A data processing program for execution in a data processing system comprising software code portions for performing a method for implementing a latch arrangement according to claim 13 when said program is run on said data processing system.

15. A computer program product stored on a computer-usable medium, comprising computer-readable program means for causing a computer to perform a method for implementing a latch arrangement according to claim 13 when said program is run on said computer.

\* \* \* \* \*